No. 789,205. PATENTED MAY 9, 1905.
V. CHARTENER.
REVERSING GEAR.
APPLICATION FILED AUG. 17, 1904.
2 SHEETS—SHEET 2.
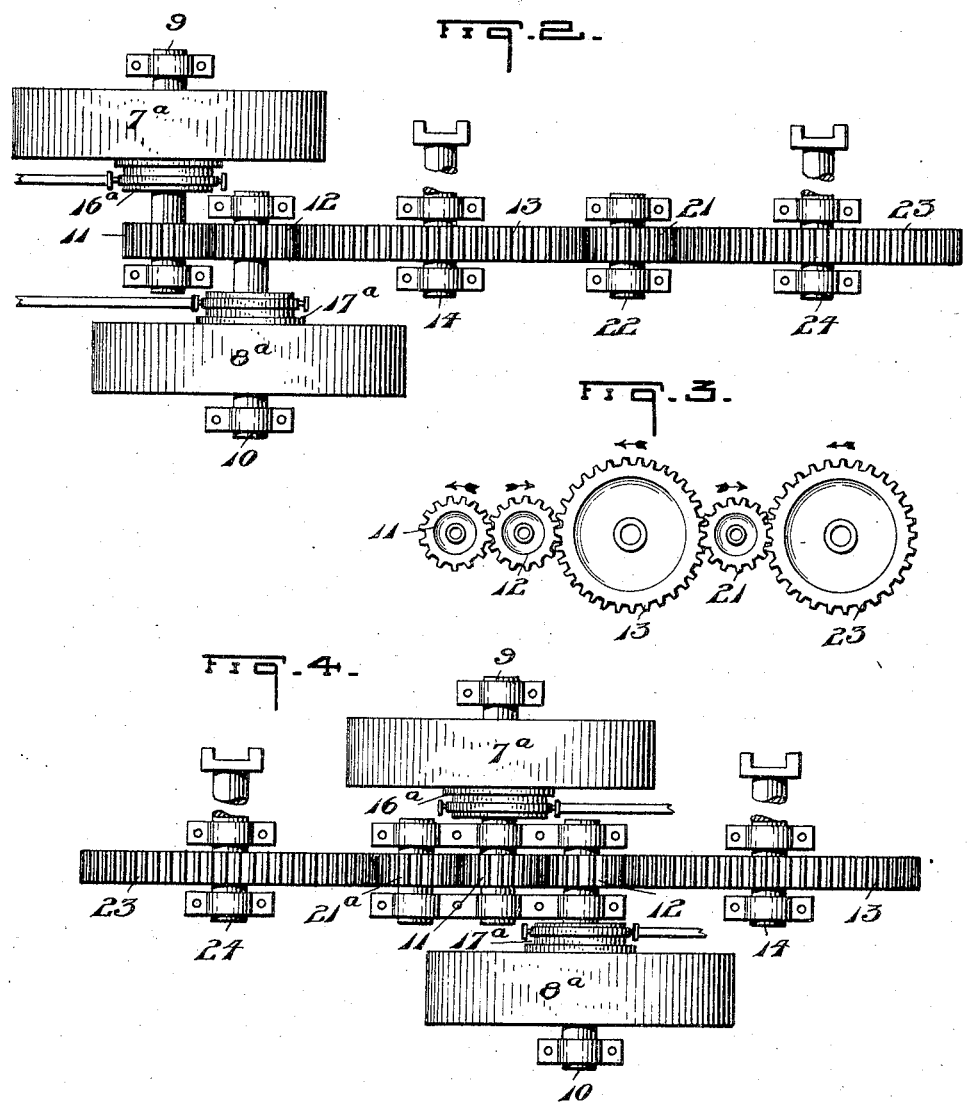

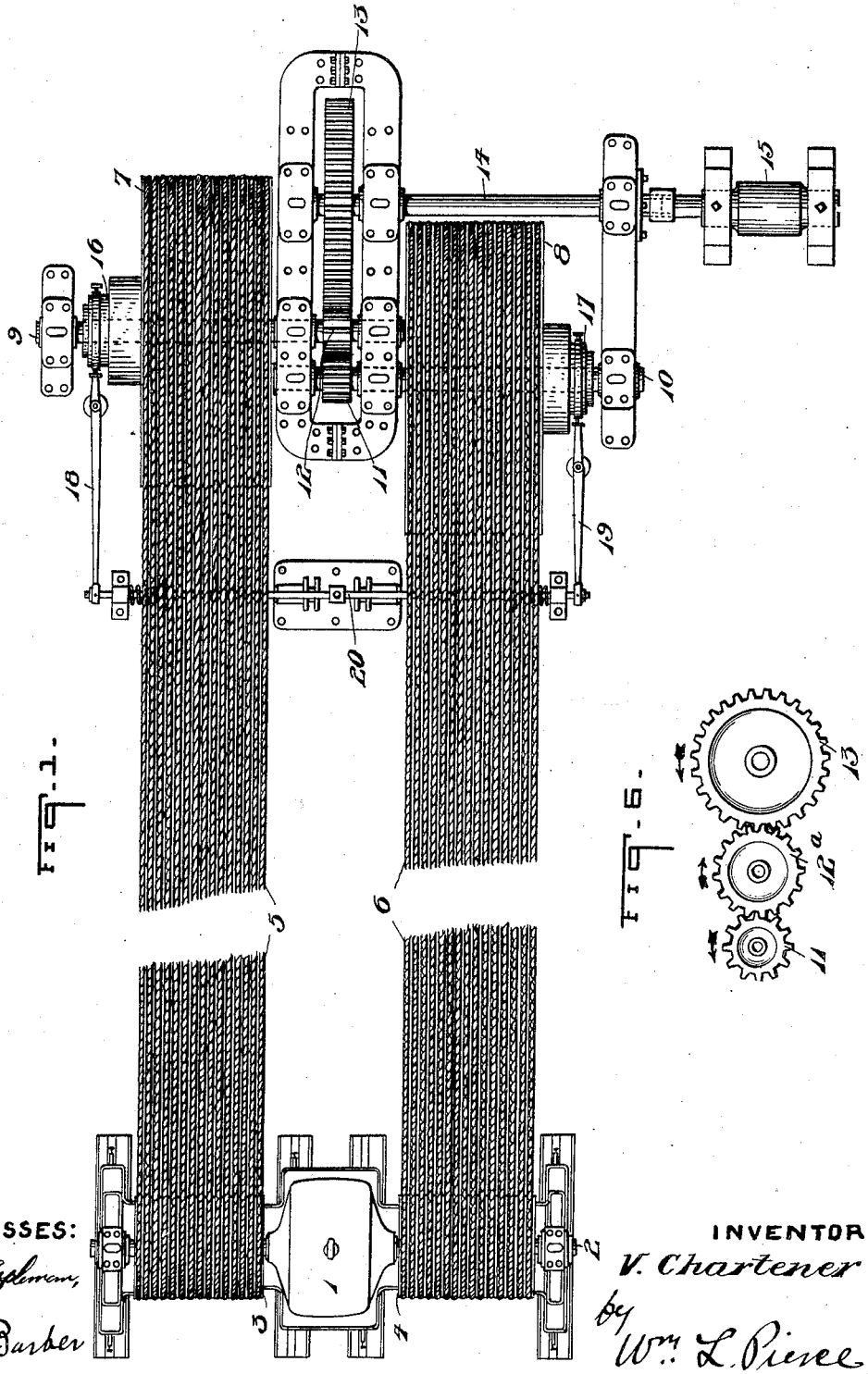

No. 789,205.  
Patented May 9, 1905.

UNITED STATES PATENT OFFICE.

VICTOR CHARTENER, OF PITTSBURG, PENNSYLVANIA, ASSIGNOR TO A. GARRISON FOUNDRY COMPANY, A CORPORATION OF PENNSYLVANIA.

REVERSING-GEAR.

SPECIFICATION forming part of Letters Patent No. 789,205, dated May 9, 1905.

Application filed August 17, 1904. Serial No. 221,084.

*To all whom it may concern:*

Be it known that I, VICTOR CHARTENER, a citizen of the United States of America, residing at Pittsburg, in the county of Allegheny and State of Pennsylvania, have invented or discovered new and useful Improvements in Reversing-Gears, of which the following is a specification.

My invention relates to mechanism for reversing rotary motion.

It has been common to reverse the rotation of a shaft by using open and crossed belts running over loose pulleys, either of which can be clutched at will or automatically to the said shaft to give the different directions of rotation. This is objectionable, because there is a great deal of power wasted in the friction of the crossed belt, and the crossed belt is greatly strained and rapidly worn out. Furthermore, it is obviously not practical to use a rope-drive after the manner of a crossed belt. It has also been proposed to employ two loose belts running over pulleys on the driving and driven shafts and to alternately apply belt-tightening devices to the belts; but this requires one of the belts to run loosely backward over one of the pulleys on the driven shaft, whereby the belt is wasted away and much power lost in friction. It is old to employ two lines of shafting lying in two planes crossing at the axis of the driven shaft, the two lines of shafting driving the driven shaft in opposite directions through clutches. This construction requires a large number of gear-wheels and extra expense in making the housings for the lines of shafting. Other methods have been proposed for reversing shafts; but they are more or less objectionable because of their complexity and their excessive cost, friction, or waste of belting.

By my invention I preferably mount all my shafting in the same horizontal line and employ but few gear-wheels. I cause the driving-belts, together with the driven pulleys, to run continuously in the same direction. This enables me to use fly-wheels or large heavy pulleys to give steadiness to the motion.

Referring to the drawings, Figure 1 is a plan view of one form of my invention; Fig. 2, a plan of a modification thereof; Fig. 3, a diagram in side view of the gearing shown in Fig. 2; Fig. 4, a plan of a second modification of my invention; Fig. 5, a diagram in side view of Fig. 4, and Fig. 6 a diagram in side view of a modification of Fig. 1.

Referring to Fig. 1, 1 designates a motor driving the shaft 2, on which are mounted the pulleys 3 and 4. These pulleys communicate motion through the rope-drives 5 and 6 to the two pulleys 7 and 8 on the shafts 9 and 10. The shaft 10 has the pinion 11, which meshes with the pinion 12 on the shaft 9, the pinion 12 in turn meshing with the spur-gear 13 on the shaft 14, which may communicate motion to a stand of rolls 15 (only one being shown) or to a planer or shaper bed or other device requiring a reversal of movement. The pulley 7 has the clutch 16 and the pulley 8 the clutch 17, preferably friction-clutches, rotatable with their respective shafts. These clutches are operated alternately by the levers 18 and 19, connected by the link 20, so as to connect either the shaft 9 to the pulley 7 or the shaft 10 to the pulley 8 in a well-known manner. The motor 1 drives the ropes 5 and 6 and the pulleys 7 and 8 always in the same direction. When the clutch 16 is operated to connect it to the shaft 9, the pulley 8 runs idly on the shaft 10, and the pinion 11 drives the wheel 13 and shaft 14 in one direction; but when the clutches are shifted so as to connect pulley 8 and shaft 10 the pulley 7 runs idly, and the pinion 12 drives the wheel 13 and shaft 14. The momentum of the pulleys 7 and 8 does not first have to be overcome. All that is necessary is to reverse the wheel 13, the shaft 14, and such other mechanism, as the rolls 15, as may be required to be reversed.

Referring now to Figs. 2 and 3, the pulleys 7ª and 8ª are shown for use with flat belts, and the clutches 16ª and 17ª are shown between the pulleys. The pinions 11 and 12, the wheel 13, and the shafts 9, 10, and 14 are the same as on Fig. 1. The wheel 13 gears with the pinion 21 on the shaft 22, and the pinion 21 gears with the spur-wheel 23 on the shaft 24. The shafts 14 and 24 are working shafts and may be connected to two separate stands of rolls or to any other pair of mechanisms. The arrows on Fig. 3 show that the wheels 13 and 23 rotate always in the same direction. The operation of the mechanism of Figs. 2 and 3 is the same as that of Fig. 1, except that at each reversal of the wheel 13 the wheel 23 will also be reversed.

Figs. 4 and 5 are the same as Figs. 2 and 3, except that the wheel 23 is not driven by a pinion geared directly to the wheel 13, but by the pinion 21$^a$, geared to the pinion 11. The operation is as follows: When the pulley 7$^a$ is driving, the wheel 13 is driven by the pinions 11 and 12, as in Figs. 1 and 2, and the wheel 23 is driven by the pinions 11 and 21$^a$, the wheels 13 and 23 both rotating in the same direction. When the pulley 8$^a$ is driving, the wheel 13 is driven by the pinion 12, and the wheel 23 is driven by the pinions 12, 11, and 21$^a$, both wheels 13 and 23 having the direction of rotation reversed. The arrows on Fig. 5 show that both wheels 13 and 23 rotate in the same direction.

Referring to Fig. 6, the cog-gearing is the same as in Fig. 1, except that the pinion 12$^a$, which corresponds to the pinion 12 of Fig. 1, is shown larger than the pinion 11. This permits the smaller pinion, as 11, to drive the wheel 13 at a slow speed in one direction and the larger pinion, as 12$^a$, to drive the wheel 13 at a more rapid speed in the opposite direction. This mechanical principle is found in planers where the bed moves slowly during the action of the chisel, but rapidly during the return movement. The joint use of the large and small pinion may be employed in any situation where alternate slow and rapid reverse movements are required. Either pinion may be made larger than the other.

In order to reverse the rotation of the shaft 14, it is necessary to use only three gear-wheels between said shaft and the driving-clutch shafts—a far simpler construction than has been heretofore employed for reversing the rolls of rolling-mills or the like. The shafting is all in one line, which reduces the cost of construction, as each housing is low and simple; but it would be possible to place the shafting out of line while still employing my invention. There is practically no momentum to be overcome at reversal except that of the mechanism necessary to be reversed.

I do not desire to be limited to the precise construction shown and described, but include within the same all fair equivalents thereof. For example, if the clutches were removed to the motor-shaft I would regard the same within the scope of my invention.

Having described my invention, I claim—

1. In a reversing mechanism, a driven shaft, two driving-shafts therefor connected to rotate in opposite directions, one of the latter connected to the driven shaft and separate means for alternately driving the said driving-shafts.

2. In a reversing mechanism, a driven shaft, two driving-shafts therefor connected to rotate in opposite directions, one of the latter connected to the driven shaft and separate means rotatable continuously in the same direction for alternately driving the said driving-shafts.

3. In a reversing mechanism, a gear-wheel and two gear-wheels meshing therewith, driving-shafts on which the middle and one of the extreme wheels are mounted, a coöperating clutch member for connecting each driving-shaft to, and disconnecting it from, its associated wheel, and means for alternately causing the clutches to drive their corresponding gear-wheels.

4. In a reversing mechanism, a gear-wheel and two gear-wheels meshing therewith, driving-shafts on which the middle and one of the extreme wheels are mounted, a coöperating clutch member for connecting each driving-shaft to, and disconnecting it from, its associated wheel, and means for alternately causing the clutches to drive their corresponding gear-wheels, in combination with a fourth gear-wheel, and a fifth wheel geared thereto, the latter being an idler geared to one of the extremes of the first three wheels.

5. In a reversing mechanism, two driving-shafts, intermeshing gear-wheels thereon of different diameters, a shaft connected to be driven by either of the driving-shafts, and means for alternately driving the said driving-shafts in opposite directions.

Signed at Pittsburg this 11th day of August, 1904.

VICTOR CHARTENER.

Witnesses:
F. N. BARBER,
A. M. STEEN.